(12) United States Patent
Vassilieva

(10) Patent No.: US 7,778,360 B2
(45) Date of Patent: Aug. 17, 2010

(54) DEMODULATING A SIGNAL ENCODED ACCORDING TO ASK MODULATION AND PSK MODULATION

(75) Inventor: Olga I. Vassilieva, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 789 days.

(21) Appl. No.: 11/621,169

(22) Filed: Jan. 9, 2007

(65) Prior Publication Data
US 2008/0165900 A1 Jul. 10, 2008

(51) Int. Cl.
*H03D 3/22* (2006.01)
*H03D 1/24* (2006.01)
*H04L 27/22* (2006.01)

(52) U.S. Cl. ...................... 375/329; 375/320

(58) Field of Classification Search ................ 375/329, 375/322, 316
See application file for complete search history.

(56) References Cited

U.S. PATENT DOCUMENTS

| 4,255,713 A * | 3/1981 | Yoshida ................ 329/309 |
| 2001/0006540 A1 * | 7/2001 | Kim et al. ............... 375/340 |
| 2003/0002121 A1 * | 1/2003 | Miyamoto et al. ........ 359/183 |
| 2004/0120033 A1 * | 6/2004 | Beal et al. .............. 359/377 |
| 2005/0018785 A1 * | 1/2005 | Oshima ................. 375/265 |
| 2006/0083406 A1 * | 4/2006 | Ishimura et al. .......... 382/106 |
| 2007/0178866 A1 * | 8/2007 | Beukema et al. ......... 455/190.1 |

OTHER PUBLICATIONS

Ohm, Michael, et al., "*Quaternary Optical ASK-DPSK and Receivers With Direct Detection*", IEEE Photonics Technology Letters, vol. 15, No. 1, pp. 159-161, Jan. 2003.
Kikuchi, Nobuhiko, et al., "*Study on Cross-Phase Modulation (XPM) Effect on Amplitude and Differentially Phase-Modulated Multilevel Signals in DWDM Transmission*", IEEE Photonics Technology Letters, vol. 17, No. 7, pp. 1549-1551, Jul. 2005.

* cited by examiner

*Primary Examiner*—David C Payne
*Assistant Examiner*—Brian J Stevens
(74) *Attorney, Agent, or Firm*—Baker Botts L.L.P.

(57) ABSTRACT

A system operable to demodulate a PSK-ASK encoded signal encoded according to ASK modulation and PSK modulation includes one or more inversion modulators. An inversion modulator receives an ASK-decoded signal generated according to a first signal split from the PSK-ASK encoded signal. The inversion modulator includes an inverter and an amplitude modulator. The inverter inverts the ASK-decoded signal to yield an inverted ASK-decoded signal, and the amplitude modulator modulates a second signal split from the PSK-ASK encoded signal according to the inverted ASK-decoded signal prior to PSK demodulation.

22 Claims, 5 Drawing Sheets

DEMODULATING A SIGNAL ENCODED ACCORDING TO ASK MODULATION AND PSK MODULATION

TECHNICAL FIELD

This invention relates generally to the field of signal communication and more specifically to demodulating a signal encoded according to ASK modulation and PSK modulation.

BACKGROUND

Signals may be modulated using phase-shift keying (PSK) and amplitude-shift keying (ASK) modulation to communicate data. In PSK modulation, changes in the phase of a signal are used to represent data, and in ASK modulation, changes in the amplitude of a signal are used to represent data.

A transmitter may include PSK and ASK modulators. The PSK modulator translates a bit sequence into signal phase changes that represent the bit sequence, and the ASK modulator translates another bit sequence into signal amplitudes that represent the bit sequence. A receiver may include PSK and ASK demodulators. The PSK demodulator translates the phase changes and the ASK demodulator translates the amplitudes to retrieve the bit sequences.

In ASK modulation, an extinction ratio refers to the ratio of the optical power of a "1" pulse to the optical power of a "0" pulse. In general, a higher extinction ratio may improve ASK communication. In ASK-PSK modulation, however, ASK communication may be optimal at an extinction ratio of 10 decibels, but PSK communication may not be optimal. Known systems typically select an extinction ratio that is a compromise between the optimal extinction ratio for ASK communication and the optimal extinction ratio for PSK communication. For example, an extinction ratio of 7 decibels may be selected. The compromise extinction ratio, however, is typically not optimal for either ASK or PSK communication.

SUMMARY OF THE DISCLOSURE

In accordance with the present invention, disadvantages and problems associated with previous techniques for demodulating a signal encoded according to ASK modulation and PSK modulation may be reduced or eliminated.

According to one embodiment of the present invention, a system operable to demodulate a PSK-ASK encoded signal encoded according to ASK modulation and PSK modulation includes one or more inversion modulators. An inversion modulator receives an ASK-decoded signal generated according to a first signal split from the PSK-ASK encoded signal. The inversion modulator includes an inverter and an amplitude modulator. The inverter inverts the ASK-decoded signal to yield an inverted ASK-decoded signal, and the amplitude modulator modulates a second signal split from the PSK-ASK encoded signal according to the inverted ASK-decoded signal prior to PSK demodulation.

Certain embodiments of the invention may provide one or more technical advantages. A technical advantage of one embodiment may be that a demodulator may modulate the PSK-ASK signal to selectively modify the amplitude of the signal prior to PSK demodulation. In the embodiment, the demodulator splits a PSK-ASK signal that is encoded according to ASK and PSK modulation. A first signal is ASK demodulated to yield an ASK-decoded signal. A second signal is modulated according to an inverted ASK-decoded signal to selectively modify the amplitude of the second signal. Selectively increasing the amplitude may reduce the detrimental effects of a low extinction ratio on PSK communication.

Another technical advantage of one embodiment may be that the demodulator may demodulate a PSK-ASK signal that is encoded according to multi-level ASK modulation. A discriminator may be used to separate a combined ASK-decoded signal into ASK-decoded signals that may then be inverted.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
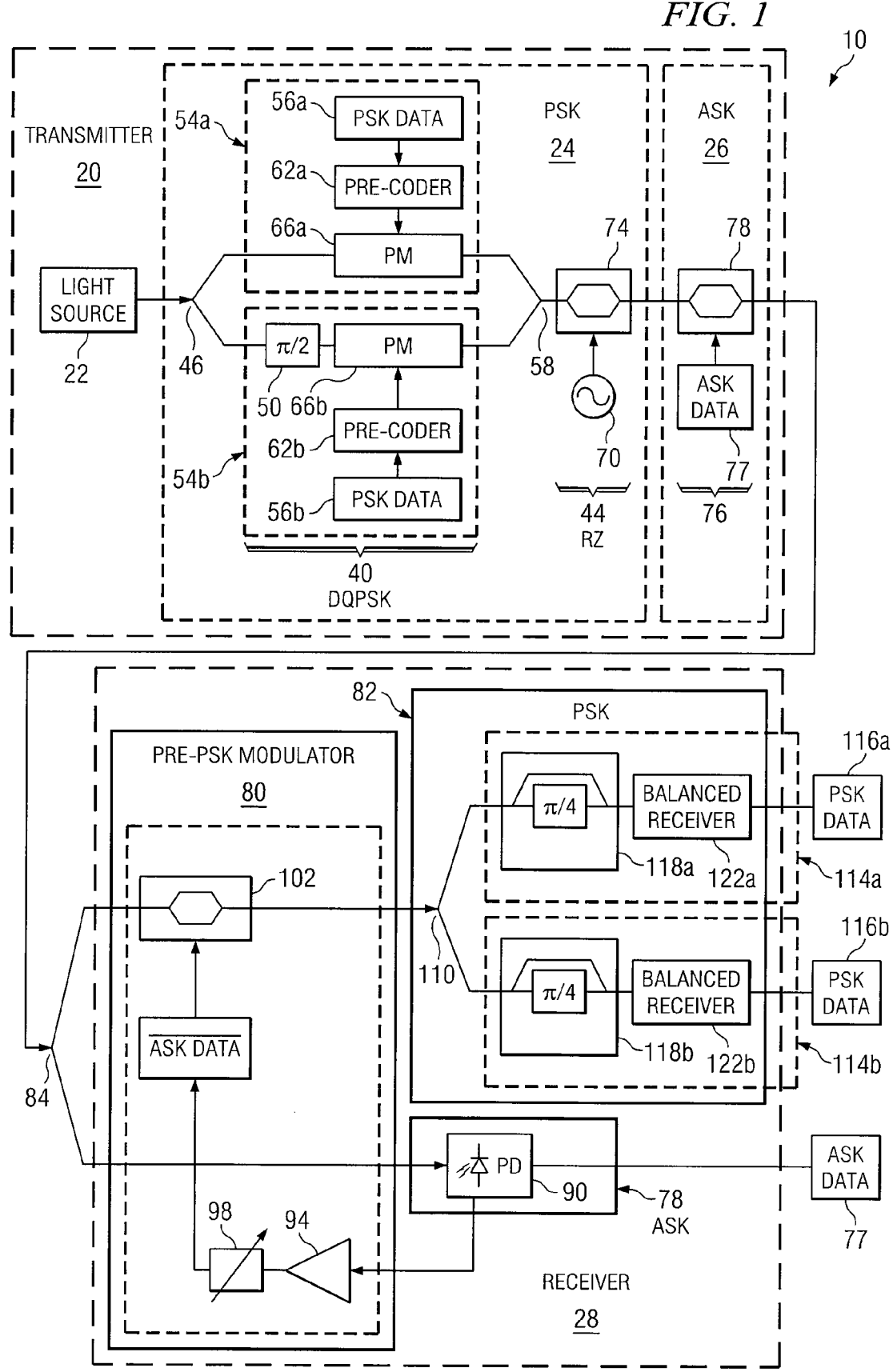
FIG. 1 illustrates one embodiment of a system for communicating a signal according to amplitude-shift keying (ASK) and phase-shift keying (PSK) modulation.

FIG. 1 illustrates one embodiment of a system 10 for communicating a signal according to amplitude-shift keying (ASK) and phase-shift keying (PSK) modulation. According to the embodiment, system 10 includes a demodulator that may modulate the PSK-ASK signal to selectively modify the amplitude of the signal prior to PSK demodulation. In the embodiment, the demodulator splits a PSK-ASK signal that is encoded according to ASK and PSK modulation. A first signal is ASK demodulated to yield an ASK-decoded signal. A second signal is modulated according to an inverted ASK-decoded signal to selectively modify the amplitude of the second signal. Selectively increasing the amplitude may reduce the detrimental effects of a low extinction ratio on PSK communication.

According to one embodiment, system 10 communicates signals. A signal may refer to an optical signal transmitted as light pulses. An optical signal may have a frequency of approximately 1550 nanometers, and a data rate of, for example, 10, 20, 40, or over 40 gigabits per second. A signal may communicate any suitable information such as voice, data, audio, video, multimedia, other information, or any combination of the preceding.

System 10 includes devices that may have components operable to perform the operations of the device. For example, a device may comprise logic, an interface, a memory, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may receive input, send output, perform suitable processing of the input or output or both, or any combination of the preceding, and may comprise one or more ports, conversion software, or both. "Memory" may store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

According to the illustrated embodiment, system 10 includes a transmitter 20 operable to communicate a signal to a receiver 28. According to the embodiment, transmitter 20 modulates a signal according to PSK and ASK modulation to encode data in a PSK-ASK encoded signal. Receiver 28 demodulates the PSK-ASK signal according to PSK and ASK demodulation to decode the data encoded in the signal. Transmitter 20 and receiver 28 may perform PSK and ASK modulation and demodulation as described with reference to FIGS. 2A and 2B.

Figure 2A:
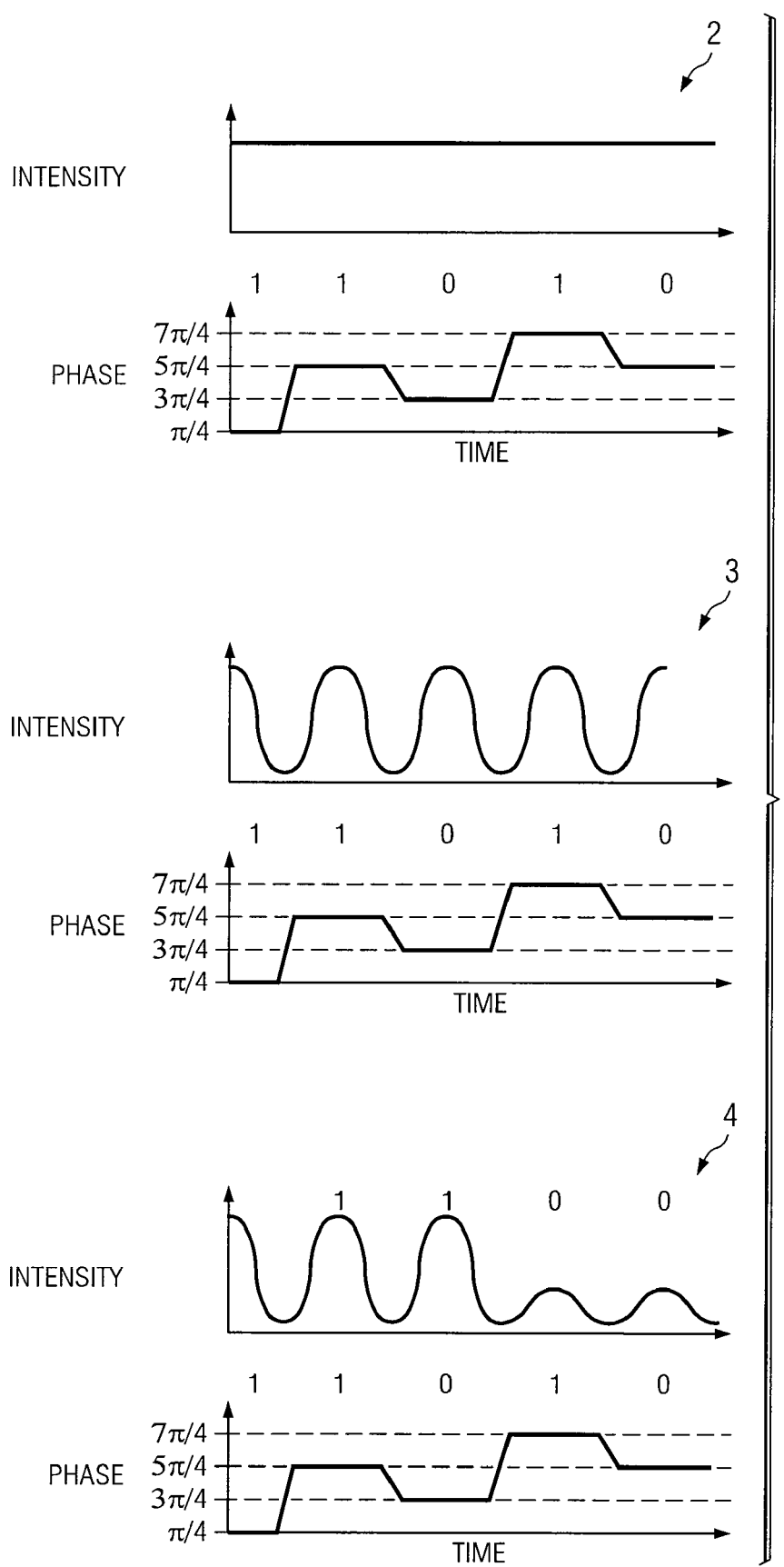
FIGS. 2A and 2B illustrate an example of PSK and ASK modulation and demodulation of a signal that may be performed by the system of FIG. 1.
Figure 2B:
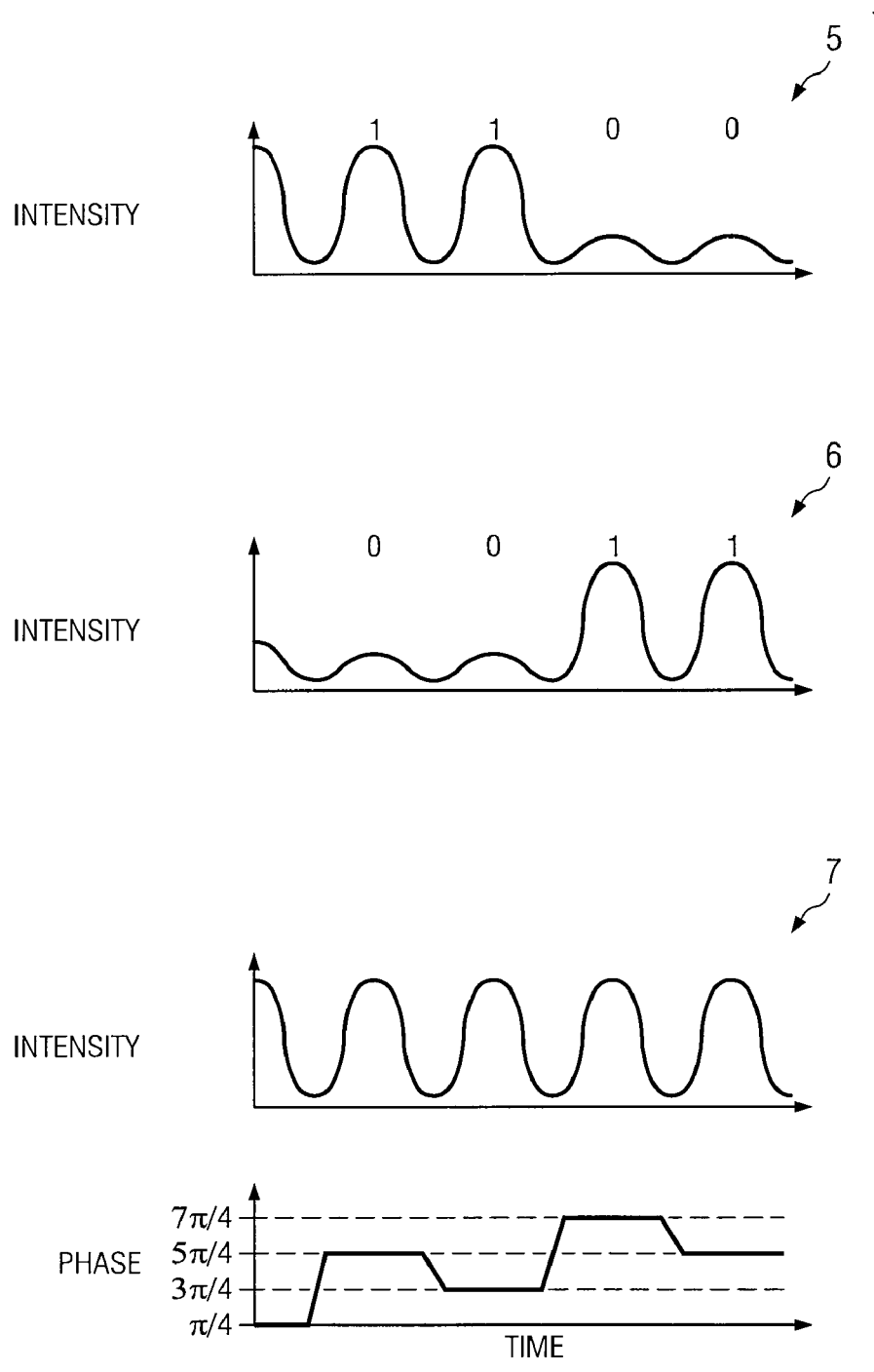

FIGS. 2A and 2B illustrate an example of PSK and ASK modulation and demodulation of a signal that may be performed by system 10 of FIG. 1. Diagrams 2 through 4 illustrate PSK and ASK modulation of a signal to yield a PSK-ASK encoded signal to be transmitted. Diagram 2 illustrates PSK modulation that encodes bit sequence 11010 in a signal. Diagram 3 illustrates return-to-zero (RZ) modulation that modulates the amplitude of the PSK signal. Diagram 4 illustrates ASK modulation of the signal that encodes bit sequence 1100 in the signal to yield a PSK-ASK encoded signal.

Diagrams 5 and 6 illustrate demodulation of the PSK-ASK encoded signal. The signal is split into a first signal and a second signal. Diagram 5 illustrates ASK demodulation of the first signal to yield an ASK-decoded signal corresponding to bit sequence 1100. Diagram 6 illustrates inversion of the ASK-decoded signal to yield an inverted ASK-decoded signal corresponding to bit sequence 0011. Diagram 7 illustrates the second signal modulated using the inverted ASK-decoded signal to selectively modify the amplitude of the second signal. Selectively modifying the amplitude may reduce the detrimental effects of a low extinction ratio on PSK communication.

Referring back to FIG. 1, transmitter 20 may include one or more suitable components operable to modulate a signal according to PSK modulation and ASK modulation. According to the illustrated embodiment, transmitter 20 includes a light source 22, a PSK modulator 24, and an ASK modulator 26 coupled as shown.

According to the embodiment, light source 22 emits a light beam that may be encoded with bits to yield a signal that communicates information. Light source 22 may emit a continuous wave light beam that may be split into one or more signals for encoding.

PSK modulator 24 modulates a signal according to PSK modulation. According to one embodiment, PSK modulation may refer to differential PSK (DPSK) modulation. In DPSK modulation, phase shifts between successive symbols represent bits. According to n-phase-shift keying (n-PSK) modulation, n different phase shifts may be used to encode p bits per symbol, where $n=2^p$. For example, differential binary PSK (DBPSK) uses two phase shifts to encode one bit per symbol, and differential quadrature PSK (DQPSK) uses four phase shifts to encode two bits per symbol.

According to the illustrated embodiment, PSK modulator 24 may include a DQPSK module 40 and a return-to-zero (RZ) module 44 coupled as shown. According to the illustrated embodiment, DQPSK module 40 may include a splitter 46, a phase shifter 50, one or more PSK data encoders 54, and a coupler 58 coupled as shown.

Splitter 46 splits the signal from light source 22 to yield signals, one for each PSK data encoder 54. Phase shifter 50 shifts the phase of a signal in order to create a phase difference appropriate for the level n of n-PSK modulation. In the illustrated embodiment, the phase is shifted by $\pi/2$.

A PSK data encoder 54 encodes PSK data 56 according to PSK modulation, and may include a pre-coder 62 and a phase modulator 66 coupled as shown. Pre-coder 62 performs pre-coding operations on PSK data 56. Phase modulator 66 modulates the phase of the signal according to PSK data 56 in order to encode PSK data 56 into the signal. Coupler 58 couples the encoded signals from PSK data encoders 54 to yield a PSK encoded signal.

RZ module 44 modulates the PSK encoded signal according to RZ modulation to return the amplitude of the signal to zero between each pulse. RZ module 44 may include a clock 70 and an amplitude modulator 74. Clock 70 provides a clock signal. Amplitude modulator 74 modulates the PSK encoded signal according to the clock signal received from clock 70. Amplitude modulator 74 may represent any suitable amplitude modulator. In general, examples of an amplitude modulator include an intensity modulator such as a Mach-Zehnder modulator.

ASK modulator 26 encodes a signal according to ASK modulation. In ASK modulation, amplitude shifts between successive symbols represent bits. According to n-level amplitude-shift keying (n-level ASK) modulation, n different amplitude shifts may be used to encode p bits per symbol, where $n=2^p$. For example, 2-level ASK uses two amplitude shifts to encode one bit per symbol, and 4-level ASK uses four amplitude shifts to encode two bits per symbol.

ASK modulator 26 may include one or more ASK data encoders 76, such as one ASK data encoder 76 as shown in FIG. 1. ASK data encoder 76 encodes ASK data 77 into a signal according to ASK modulation. ASK data encoder 76 may include one or more components for encoding the signal. According to the illustrated embodiment, ASK data encoder 76 includes an amplitude modulator 78 operable to modulate the amplitude the signal according to ASK data 77.

Receiver 28 may include one or more suitable components operable to demodulate a signal according to PSK and ASK demodulation. According to the illustrated embodiment, receiver 28 includes an ASK demodulator 78, a pre-PSK demodulation modulator 80, and a PSK demodulator 82 coupled as shown.

Splitter 84 splits the PSK-ASK encoded signal to yield signals for PSK and ASK demodulation. ASK demodulator 78 demodulates a signal split from the PSK-ASK encoded signal to yield an ASK-decoded signal corresponding to ASK data 77. ASK demodulator 78 may include a photodiode 90. Photodiode 90 translates the amplitude shifts to an electrical signal to yield the ASK-decoded signal.

Pre-PSK demodulation modulator 80 modulates a signal split from the PSK-ASK encoded signal according to an inverted ASK-decoded signal to selectively modify the amplitude of the signal. Selectively increasing the amplitude may reduce the detrimental effects of a low extinction ratio on PSK communication.

Pre-PSK demodulation modulator 80 may include one or more inversion modulators 92, such as one inversion modulator 92 as shown in FIG. 1. An inversion modulator 92 inverts the ASK-decoded signal. Inversion modulator 92 may include an inverter 94, a delay 98, and a modulator 102 coupled as shown. Inverter 94 inverts the ASK-decoded signal to yield an inverted ASK-decoded signal. Inverter 94 may comprise a logical inverter.

Delay 98 may introduce a delay such that the inverted ASK-decoded signal and the signal split from the PSK-ASK signal arrive at modulator 102 at substantially the same time. Although inverter 94 is illustrated as placed before delay 98, delay 98 may be placed before inverter 94. Inversion modulator 92 may also include an amplifier that amplifies the inverted ASK-decoded signal. Modulator 102 modulates the ASK-PSK encoded signal according to the inverted ASK-decoded signal. Modulator 102 may have the same or substantially the same extinction ratio as ASK modulator 78.

PSK demodulator 82 demodulates the signal modulated by modulator 80 to yield a PSK-decoded signal. PSK demodulator 82 may demodulate the PSK encoded signal by comparing the phase shifts between successive bits. PSK demodulator 82 may include a splitter 110 and one or more PSK data decoders 114. Splitter 110 may split the received signals into multiple signals, one for each PSK data decoder 114.

Data decoders 114 decode the signal to yield PSK data 116. PSK data decoder 114 may include a decoder 118 and a receiver 122. Decoder 118 may split a received signal to yield multiple signals and delay a signal by one bit to yield a delayed signal and a non-delayed signal. Decoder 118 may then constructively and destructively interfere the delayed and non-delayed signals to compare the phases of successive bits. Receiver 122 may include photodetectors that detect the interference. PSK data 116 is generated in accordance with the interference.

Modifications, additions, or omissions may be made to system 10 without departing from the scope of the invention. The components of system 10 may be integrated or separated according to particular needs. Moreover, the operations of system 10 may be performed by more, fewer, or other devices. Additionally, operations of system 10 may be performed using any suitable logic. As used in this document, "each" refers to each member of a set or each member of a subset of a set.

Figure 3:
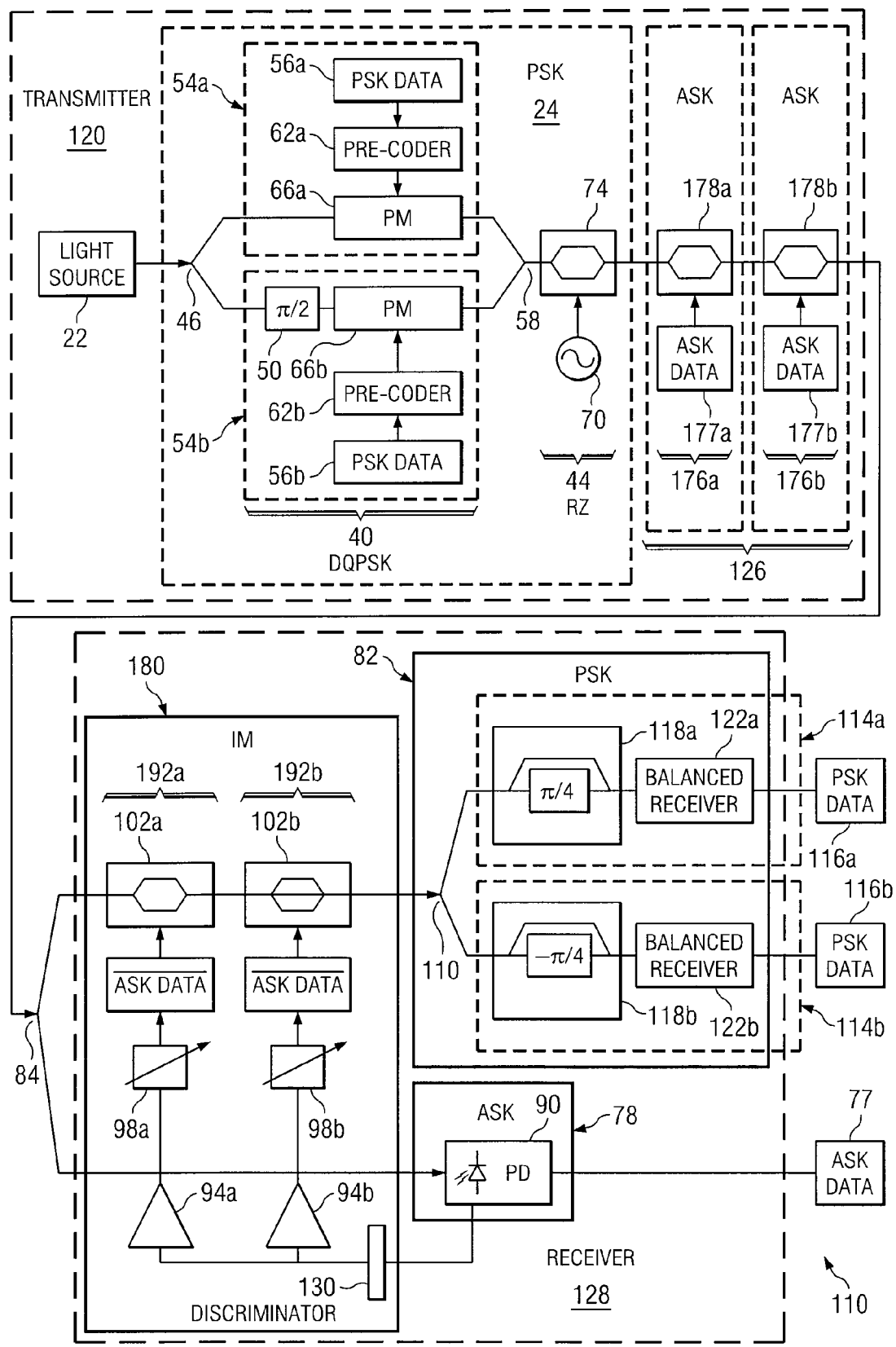
FIG. 3 illustrates another embodiment of a system for communicating a signal according to ASK and PSK modulation.

FIG. 3 illustrates another embodiment of a system 110 for communicating a signal according to ASK and PSK modulation. System 110 includes a transmitter 120 and a receiver 128 that may perform similar operations as transmitter 20 and receiver 28 of FIG. 1.

Transmitter 120 modulates a signal according to PSK modulation and ASK modulation. Transmitter 120 includes light source 22 and PSK module 24, which may be as described with reference to FIG. 1. Transmitter 120 also includes ASK modulator 126 that may perform similar operations as ASK modulator 26 of FIG. 1. ASK modulator 126 may include one or more ASK data encoders 176, such as two ASK data encoders 176a-b as shown in FIG. 1. An ASK data encoder 176 encodes particular ASK data 177 into a signal according to ASK modulation. For example, ASK data encoder 176a encodes ASK data 177a, and ASK data encoder 176b encodes ASK data 177b. An ASK data encoder 176 may be substantially similarly to ASK data encoder 76 of FIG. 1. According to the illustrated embodiment, ASK data encoder 176a includes an amplitude modulator 178a, and ASK data encoder 176b includes an amplitude modulator 178b.

Receiver 128 demodulates a PSK-ASK encoded signal according to PSK demodulation and ASK demodulation. Receiver 128 includes PSK demodulator 82 and ASK demodulator 78, which may be as described with reference to FIG. 1. ASK demodulator 78 demodulates a signal split from the PSK-ASK encoded signal to yield a combined ASK-decoded signal. The combined ASK-decoded signal corresponds to ASK data 177a-b encoded by ASK module 126.

Receiver 128 also includes pre-PSK demodulation modulator 180 that may perform similar operations as pre-PSK demodulation modulator 80 of FIG. 1. Pre-PSK demodulation modulator 180 may include a discriminator 130 and one or more inversion modulators 192, such as two inversion modulators 92 as shown in FIG. 1, coupled as shown.

Discriminator 130 receives and separates the combined ASK decoded signal to yield ASK-decoded signals that each communicate particular ASK data 177. In the example, one ASK-decoded signal communicates ASK data 177a, and another ASK-decoded signal communicates ASK data 177b. Each ASK-decoded signal is sent to a particular inversion modulator 192. In the example, one ASK-decoded signal is sent to inversion modulator 192a, and the other ASK-decoded signal is sent to inversion modulator 192b.

An inversion modulator 192 inverts an ASK-decoded signal communicating ASK data 177. In the example, inversion modulator 192a inverts an ASK-decoded signal communicating ASK data 177a, and inversion modulator 192b inverts an ASK-decoded signal communicating ASK data 177b. Inversion modulator 192 may have the same or substantially the same extinction ratio as ASK modulator 178.

Modifications, additions, or omissions may be made to system 110 without departing from the scope of the invention. The components of system 110 may be integrated or separated according to particular needs. Moreover, the operations of system 110 may be performed by more, fewer, or other devices. Additionally, operations of system 10 may be performed using any suitable logic.

Figure 4:
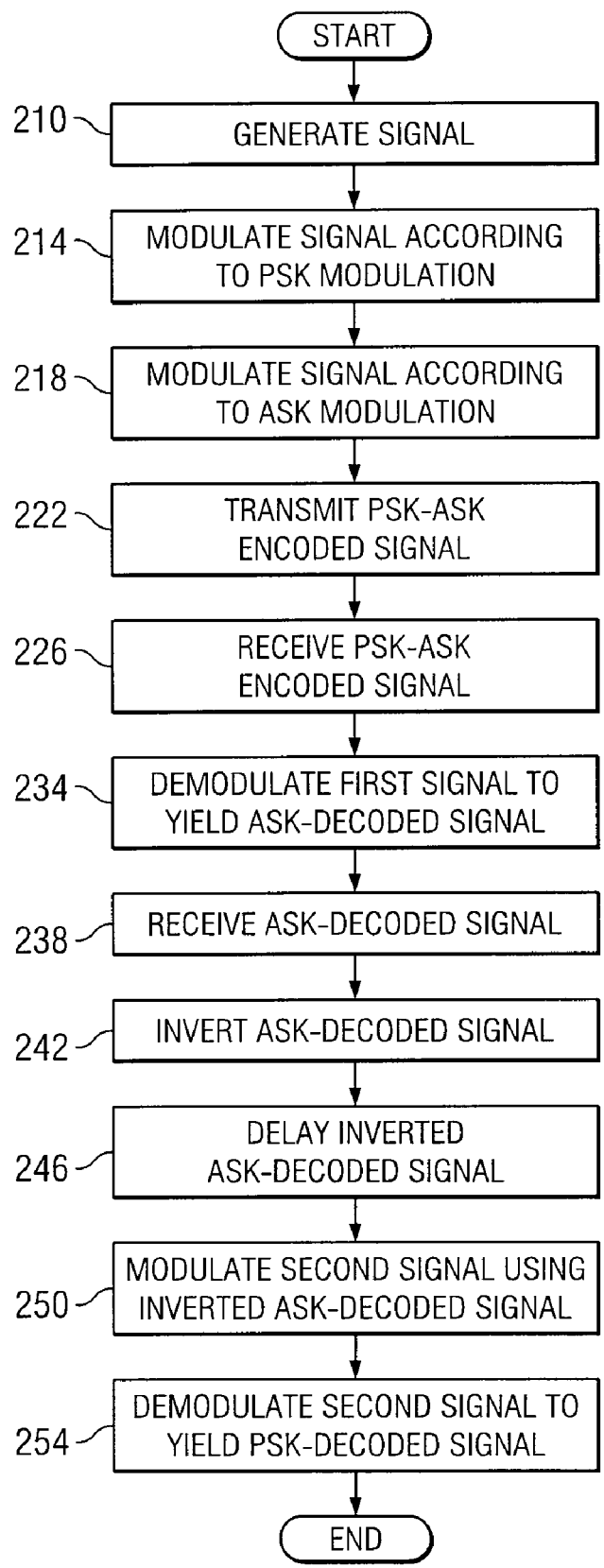
FIG. 4 illustrates one embodiment of a method for communicating a signal according to according to ASK and PSK modulation.

FIG. 4 illustrates one embodiment of a method for communicating a signal according to ASK and PSK modulation. The method may be performed by system 10 of FIG. 1 or system 110 of FIG. 3.

The method begins at step 210, where light source 22 generates a signal. The signal is modulated according to PSK modulation at step 214. In one embodiment, DQPSK module 40 may PSK modulate the signal to encode PSK data 56, and RZ module 44 may RZ modulate the signal. The signal is modulated according to ASK modulation at step 218. In one embodiment, ASK module 26 may ASK modulate the signal to encode ASK data 77. The PSK-ASK encoded signal is transmitted at step 222.

Receiver 28 receives the PSK-ASK encoded signal at step 226. A first signal split from the PSK-ASK encoded signal is demodulated according to ASK demodulation at step 234 to yield an ASK-decoded signal. Pre-PSK demodulation modulator 80 receives the ASK-decoded signal at step 238. Inverter 80 inverts the ASK-decoded signal at step 242 to yield an inverted ASK-decoded signal. Delay 98 delays the inverted ASK-decoded signal at step 246.

Modulator 102 modulates a second signal split from the PSK-ASK encoded signal according to the inverted ASK-decoded signal at step 250. The modulation selectively modifies the amplitude of the second signal, which may reduce the detrimental effects of a low extinction ratio on PSK communication. The second signal is PSK demodulated at step 254 to yield a PSK decoded signal. After PSK demodulation, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a demodulator may modulate the PSK-ASK signal to selectively modify the amplitude of the signal prior to PSK demodulation. In the embodiment, the demodulator splits a PSK-ASK signal that is encoded according to ASK and PSK modulation. A first signal is ASK demodulated to yield an ASK-decoded signal. A second signal is modulated according to an inverted ASK-decoded signal to selectively modify the amplitude of the second signal. Selectively increasing the amplitude may reduce the detrimental effects of a low extinction ratio on PSK communication.

Another technical advantage of one embodiment may be that the demodulator may demodulate a PSK-ASK signal that is encoded according to multi-level ASK modulation. A discriminator may be used to separate a combined ASK-decoded signal into ASK-decoded signals that may then be inverted.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system operable to demodulate a signal encoded according to amplitude-shift keying (ASK) modulation and phase-shift keying (PSK) modulation, comprising:
   one or more inversion modulators, an inversion modulator operable to:
   receive an ASK-decoded signal generated according to a first signal split from a PSK-ASK encoded signal, the PSK-ASK encoded signal modulated according to ASK modulation and to PSK modulation;
   the inversion modulator comprising:
   an inverter operable to:
   invert the ASK-decoded signal to yield an inverted ASK-decoded signal; and
   an amplitude modulator coupled to the inverter and operable to:
   modulate a second signal split from the PSK-ASK encoded signal according to the inverted ASK-decoded signal prior to PSK demodulation.

2. The system of claim 1, the inversion modulator further comprising:
   a delay coupled to the inverter and operable to:
   synchronize the inverted ASK-decoded signal with the second signal split from PSK-ASK encoded signal.

3. The system of claim 1, further comprising:
   a discriminator coupled to the one or more inversion modulators and operable to:
   receive a combined ASK-decoded signal generated according to the PSK-ASK encoded signal; and
   separate the combined ASK-decoded signal to yield one or more ASK-decoded signals for the one or more inversion modulators.

4. The system of claim 1, wherein:
   the one or more inversion modulators comprise a number n of inversion modulators; and
   the PSK-ASK encoded signal is encoded according to n-level ASK modulation.

5. The system of claim 1, wherein:
   the one or more inversion modulators comprise two inversion modulators; and
   the PSK-ASK encoded signal is encoded according to 2-level ASK modulation.

6. The system of claim 1, wherein:
   the PSK-ASK encoded signal is encoded according to return-to-zero (RZ) modulation.

7. The system of claim 1, further comprising:
   a splitter coupled to the one or more inversion modulators and operable to:
   split the PSK-ASK encoded signal to yield the first signal and the second signal.

8. The system of claim 1, further comprising:
   an ASK demodulator coupled to the one or more inversion modulators and operable to:
   demodulate the first signal split from the PSK-ASK encoded signal to yield the ASK-decoded signal.

9. The system of claim 1, further comprising:
   a PSK demodulator coupled to the one or more inversion modulators and operable to:
   demodulate the second signal split from the PSK-ASK encoded signal to yield a PSK-decoded signal.

10. The system of claim 1, wherein the inversion modulator has substantially the same extinction ratio as modulator operable to encode the PSK-ASK encoded signal.

11. A method for demodulating a signal encoded according to amplitude-shift keying (ASK) modulation and phase-shift keying (PSK) modulation, comprising:
    performing the following for each ASK-decoded signal of one or more ASK-decoded signals generated according to a first signal split from a PSK-ASK encoded signal, the PSK-ASK encoded signal modulated according to ASK modulation and to PSK modulation:
    receiving an ASK-decoded signal;
    inverting the ASK-decoded signal to yield an inverted ASK-decoded signal; and
    modulating a second signal split from the PSK-ASK encoded signal according to the inverted ASK-decoded signal prior to PSK demodulation.

12. The method of claim 11, wherein performing the following for each ASK-decoded signal of one or more ASK-decoded signals generated according to a first signal split from a PSK-ASK encoded signal further comprises:
    synchronizing the inverted ASK-decoded signal with the second signal split from PSK-ASK encoded signal.

13. The method of claim 11, further comprising:
    receiving a combined ASK-decoded signal generated according to the PSK-ASK encoded signal; and
    separating the combined ASK-decoded signal to yield the one or more ASK-decoded signals.

14. The method of claim 11, wherein:
    the one or more ASK-decoded signals comprise a number n of ASK-decoded signals; and
    the PSK-ASK encoded signal is encoded according to n-level ASK modulation.

15. The method of claim 11, wherein:
    the one or more ASK-decoded signals comprise two ASK-decoded signals; and
    the PSK-ASK encoded signal is encoded according to 2-level ASK modulation.

16. The method of claim 11, wherein:
    the PSK-ASK encoded signal is encoded according to return-to-zero (RZ) modulation.

17. The method of claim 11, further comprising:
    splitting the PSK-ASK encoded signal to yield the first signal and the second signal.

18. The method of claim 11, further comprising:
demodulating the first signal split from the PSK-ASK encoded signal to yield the one or more ASK-decoded signals.

19. The method of claim 11, further comprising:
demodulating the second signal split from the PSK-ASK encoded signal to yield a PSK-decoded signal.

20. The method of claim 11, wherein modulating the second signal further comprises:
modulating the second signal using an inversion modulator, the inversion modulator having substantially the same extinction ratio an modulator operable to encode the PSK-ASK encoded signal.

21. A system for demodulating a signal encoded according to amplitude-shift keying (ASK) modulation and phase-shift keying (PSK) modulation, comprising:
means for performing the following for each ASK-decoded signal of one or more ASK-decoded signals generated according to a first signal split from a PSK-ASK encoded signal, the PSK-ASK encoded signal modulated according to ASK modulation and to PSK modulation:
receiving an ASK-decoded signal;
inverting the ASK-decoded signal to yield an inverted ASK-decoded signal; and
modulating a second signal split from the PSK-ASK encoded signal according to the inverted ASK-decoded signal prior to PSK demodulation.

22. A system operable to demodulate a signal encoded according to amplitude-shift keying (ASK) modulation and phase-shift keying (PSK) modulation, comprising:
a splitter operable to:
split a PSK-ASK encoded signal to yield a first signal and a second signal, the PSK-ASK encoded signal modulated according to ASK modulation and to PSK modulation, the PSK-ASK encoded signal encoded according to return-to-zero (RZ) modulation;
an ASK demodulator coupled to the splitter and operable to:
demodulate the first signal split from the PSK-ASK encoded signal to yield a combined ASK-decoded signal;
a discriminator coupled to the ASK demodulator and operable to:
separate the combined ASK-decoded signal to yield one or more ASK-decoded signals;
one or more inversion modulators coupled to the discriminator, wherein:
the one or more inversion modulators comprise two inversion modulators; and
the PSK-ASK encoded signal is encoded according to 2-level ASK modulation;
an inversion modulator operable to:
receive an ASK-decoded signal of the one or more ASK-decoded signals, the inversion modulator having substantially the same extinction ratio an modulator operable to encode the PSK-ASK encoded signal;
the inversion modulator comprising:
an inverter operable to:
invert the ASK-decoded signal to yield an inverted ASK-decoded signal;
a delay coupled to the inverter and operable to:
synchronize the inverted ASK-decoded signal with a second signal split from PSK-ASK encoded signal; and
an amplitude modulator coupled to the delay and operable to:
modulate the second signal according to the inverted ASK-decoded signal prior to PSK demodulation; and
a PSK demodulator coupled to the one or more inversion modulators and operable to:
demodulate the second signal split from the PSK-ASK encoded signal to yield a PSK-decoded signal.

* * * * *